United States Patent [19]

Ashcraft et al.

[11] Patent Number: 4,650,721
[45] Date of Patent: Mar. 17, 1987

[54] POLYPROPYLENE BARRIER FILM AND METHOD OF FORMING SAME

[75] Inventors: Charles R. Ashcraft, Victor; Michael L. Kerr, Newark, both of N.Y.

[73] Assignee: Mobil Oil Corporation, New York, N.Y.

[21] Appl. No.: 873,839

[22] Filed: Jun. 9, 1986

Related U.S. Application Data

[63] Continuation of Ser. No. 564,658, Dec. 23, 1983, abandoned.

[51] Int. Cl.[4] .............................................. B32B 27/08
[52] U.S. Cl. ................................ 428/516; 156/244.11; 428/35; 428/500; 428/910
[58] Field of Search ..................... 156/244.11; 428/35, 428/500, 516, 910; 525/309

[56] References Cited

U.S. PATENT DOCUMENTS

| | | | |
|---|---|---|---|
| 3,433,777 | 3/1969 | Brunson | 525/285 |
| 3,519,531 | 7/1970 | James et al. | 428/349 |
| 4,064,296 | 12/1977 | Bornstein et al. | 428/516 |
| 4,147,827 | 4/1979 | Breidt et al. | 428/349 |
| 4,254,169 | 3/1981 | Schroeder | 428/35 |
| 4,355,721 | 10/1982 | Knott et al. | 428/35 |
| 4,407,897 | 10/1983 | Farrell et al. | 428/516 |
| 4,447,485 | 5/1984 | Aritake | 428/150 |
| 4,511,610 | 4/1985 | Yazaki et al. | 428/35 |

Primary Examiner—Edith Buffalow
Attorney, Agent, or Firm—A. J. McKillop; M. G. Gilman; J. P. O'Sullivan, Sr.

[57] ABSTRACT

The film resulting from and the process for forming a firmly bonded film laminate combination comprising, preparing an intimate combination I of polypropylene and a maleic acid anhydride modified olefin polymer; forming a film of at least one layer of said combination I with at least one layer of a polymer II selected from the group consisting of polyvinyl alcohol and an ethylene-vinyl alcohol copolymer; and effecting adhesion between the layers by orienting the film.

6 Claims, No Drawings

POLYPROPYLENE BARRIER FILM AND METHOD OF FORMING SAME

This is a continuation of copending application Ser. No. 564,658, filed on Dec. 23, 1983 now abandoned.

The present invention relates to a composite sheet suitable for use as a gas barrier film for a food wrapping film and containers made from the same.

Although the water resistance and resistance to liquid permeation of polyolefins is well known, their resistance to gas permeability, for example, to oxygen is comparatively large. They are not generally suitable for use as containers for foods or as a wrapper for foods, medical compounds, beauty preparations and the like, unless the same is modified for the exclusion of gases.

It is an object of the present invention to provide an improved gas barrier film which also has low permeability to moisture. It is another object of this invention to provide a laminated film sheet wherein the laminated layers are bonded together with an exceptionally strong bonding force.

SUMMARY OF THE INVENTION

The present invention provides a coextruded, oriented film comprising at least one layer of an intimate combination I of polypropylene and a maleic acid anhydride modified polyolefin and at least one layer of a polymer II selected from the group consisting of polyvinyl alcohol and an ethylene vinyl alcohol copolymer and wherein the bond between the combination I layer and the polymer II layer of the film is greater in its oriented form than in its unoriented form.

The process of forming the above defined film structure comprises:

forming an intimate combination I of polypropylene and a maleic acid anhydride modified polyolefin polymer;

forming a film of at least one layer of said combination I with at least one layer of a polymer II selected from the group consisting of polyvinyl alcohol and an ethylene-vinyl alcohol copolymer; and effecting adhesion between the layers by orienting the film.

In a preferred form of the above-defined structure, the film has a core layer of the combination I and surface layers of the polymer II. It is also within the contemplation of the present invention to have the reverse of the above structure; that is, a core layer of the polymer II and surface layers of the combination I. Preferred maleic acid anhydride modified polyolefins are the so-modified polyethylenes, polypropylenes and polybutylenes.

DETAILED DESCRIPTION OF THE INVENTION

It has been determined by the present invention that a moisture and gas barrier film can be formed of a polypropylene layer and a gas barrier layer selected from the group consisting of polyvinyl alcohol and an ethylene-vinyl alcohol copolymer without the employment of a discrete adhesive layer normally necessary in bonding these films together. In U.S. Pat. No. 4,064,315, the disclosure of which is incorporated in its entirety herein by reference, it is taught that polymeric films derived from vinylidene chloride can be firmly bonded to a polypropylene layer if there is included within the polypropylene layer a proportion of a maleated polypropylene. Thus, this patent teaches a composite consisting of a coated polypropylene film wherein the coating consists of a multipolymer formed from vinylidene chloride and at least one other comonomer, said polypropylene film consisting of a layer formed from a blended mixture of from about 90% to about 99% by weight of isotatic polypropylene and from about 10% to about 1% by weight of a maleic acid anhydride-modified polypropylene. According to this patent, when the maleic anhydride modified polypropylene is compounded with polypropylene it will improve the heat seal coating to base film adhesion to the extent that one step coating is a practical method of application, hence, the need for a primer is eliminated.

In attempting to extend the teaching of this patent to a combination of a barrier layer comprising a core of polyvinyl alcohol or ethylene-vinyl alcohol copolymer coated on both sides with the modified isotatic polypropylene, a film structure of this type had virtually no layer-to-layer adhesion. The combination could be easily separated by hand-peeling.

It was discovered, however, that if the weakly bonded film combination were oriented, unexpectedly exceptional adhesion was thereby effected between the layers. Without the application of any pressure being applied in a direction normal to the film surface and employing a commercially available orientation apparatus, for example, a tenter frame excellent adherence between the two layers is obtained without the employment of a primer film therebetween i.e., the layers are in direct contact.

The maleated polyolefin additive may be derived from maleic acid or its anhydride, copolymerized with a polyolefin. The maleated polyolefin additives can be prepared by any process, for example, that disclosed in U.S. Pat. No. 3,433,777 the disclosure of which is incorporated in its entirety herein by reference. Any polyolefin is contemplated for modification, e.g. polyethylene, polypropylene, polybutylene, etc. A commercially available maleated polypropylene has the following physical characteristics: Ring and Ball softening point, 157° C.; Penetration Hardness, ASTM D 5 needle under 100-g load for 5 seconds at 25° C., 0.1 mm; Density at 25° C., 0.934; Acid No. 47; Brookfield Thermocel Viscosity, at 190° C., 400 cP; Color, Gardner Scale 11, Molecular Weight, approximately 4500.

The ethylene-vinyl alcohol copolymer referred to herein can be obtained from any commercial source. For example, extrusion grade ethylene-vinyl alcohol copolymer (EVOH) is available under the name EVAL from Kuraray Company Ltd. of Japan. This material contains about 80% of vinyl alcohol.

This invention can be illustrated by the following examples. These examples are included merely for purpose of illustration and are not intended to limit the scope of the invention unless otherwise specifically indicated.

EXAMPLE 1

Polypropylene resin was coextruded with an ethylene-vinyl alcohol copolymer (EVAL) to yield a cast film 35 mils thick. The EVAL constituted approximately 15% of the thickness dimension of the film. A sample of this film is easily delaminated by peeling one layer away from the other. By orientation of the cast film on a tenter frame, five times in the machine direction and seven times in the transverse direction to yield a film approximately 1 mil in thickness is formed. The resultant film is still easily delaminable.

EXAMPLE 2

A second laminate was formed by extruding polypropylene film and coating the cast film with a layer of polyvinyl alcohol. The coated film also was approximately 35 mils thick with the polyvinyl alcohol layer constituting approximately 15% of the laminate thickness. The polyvinyl alcohol coating could be easily peeled from the unoriented base layer illustrating very little adhesion between the two layers. The laminate was then oriented in the same manner and to the same degree as in Example 1. The resulting oriented film could also be easily delaminated by handpeeling.

EXAMPLE 3

Approximately 5% by weight of the above-identified commercially available maleated polypropylene was uniformly melt blended into the same polypropylene resin employed in Examples 1 and 2. This melt blend was coextruded with the EVAL of Example 1 to yield a cast film 35 mils thick. The EVAL constituted approximately 15% of the thickness of the composite film. Again, this composite had no meaningful adherence one layer to the other and could be easily hand-peel separated. The composite was oriented as in Example 1 to a 1 mil thick film having 5 times MDO and 7 times TDO. The resulting oriented laminate had a comparatively high bonding strength of approximately 400 grams/inch. This constituted a significant bond strength as compared to that of Examples 1 and 2.

EXAMPLE 4

Utilizing the maleated polypropylene/polypropylene blend of Example 3, a film of the same was cast extruded. A layer of polyvinyl alcohol was coated on the cast sheet. The polyvinyl alcohol constituted about 15% of the laminate thickness. As in example 2 the polyvinyl alcohol layer could be easily peeled from the maleated polypropylene/polypropylene film. This composite was biaxially oriented to a thickness of approximately 1 mil by orienting 5 times MDO and 7 times TDO on a tenter frame. After orientation the laminate had an exceptionally strong bond between the layers which was in excess of 400 grams/inch.

While specific Examples 3 and 4 show biaxial orientation of the film, it is to be understood that significant bonding of the two layers is effected by uniaxial orientation. Thus, whether the films are oriented uniaxially, sequentially biaxially or simultaneously biaxially significant bonding occurs.

Although the present invention has been described with preferred embodiments, it is to be understood that modifications and variations may be resorted to, without departing from the spirit and scope of this invention as those skilled in the art will readily understand. Such variations and modifications are considered to be within the purview and scope of the appended claims.

What is claimed is:

1. A process for forming a firmly bonded coextruded film combination comprising: forming an intimate combination I of polypropylene and a maleic acid anhydride modified olefin polymer;
    forming a film of at least one layer of said combination I with at least one layer of a polymer II selected from the group consisting of polyvinyl alcohol and an ethylene-vinyl alcohol copolymer wherein said layers are in direct contact; and effecting adhesion between the layers by orienting the film.

2. The method of claim 1 wherein said film has a core layer of said combination I and surface layers of said polymer II or a core layer of said polymer II and surface layers of said combination I.

3. The method of claim 1 wherein said maleic anhydride modified propylene polymer is present in said polypropylene in an amount of from about 0.1-10% by weight.

4. The method of claim 3 wherein said maleic acid anhydride modified propylene is present in from 0.5-3% by weight.

5. An oriented film laminate comprising at least one layer of an intimate combination I of polypropylene and a maleic acid anhydride modified polyolefin and at least one layer of polymer II selected from the group consisting of polyvinyl alcohol and an ethylene-vinyl alcohol copolymer and wherein the bond between the combination I layer and the polymer II layer of the film is greater in its oriented form than in its unoriented form.

6. The laminate of claim 5 wherein said maleated polyolefin is polypropylene.

* * * * *